United States Patent
Dotan-Cohen et al.

(10) Patent No.: US 10,567,568 B2
(45) Date of Patent: Feb. 18, 2020

(54) USER EVENT PATTERN PREDICTION AND PRESENTATION

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Ido Cohn, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/994,135

(22) Filed: May 31, 2018

(65) Prior Publication Data
US 2019/0373101 A1    Dec. 5, 2019

(51) Int. Cl.
| | |
|---|---|
| H04W 24/00 | (2009.01) |
| H04M 1/725 | (2006.01) |
| H04W 4/029 | (2018.01) |
| H04L 29/08 | (2006.01) |

(52) U.S. Cl.
CPC ........ *H04M 1/72566* (2013.01); *H04L 67/22* (2013.01); *H04L 67/306* (2013.01); *H04W 4/029* (2018.02)

(58) Field of Classification Search
CPC .. H04M 1/72566; H04L 67/22; H04L 67/306; H04W 4/029
USPC .............................. 455/456.1–456.3; 370/338
See application file for complete search history.

(56) References Cited

U.S. PATENT DOCUMENTS

| | | |
|---|---|---|
| 6,907,550 B2 | 6/2005 | Webster et al. |
| 7,277,448 B1 | 10/2007 | Long et al. |
| 8,538,992 B1 | 9/2013 | Lawyer et al. |
| 8,832,583 B2 | 9/2014 | El-Jayousi et al. |
| 9,053,467 B2 | 6/2015 | Maresh et al. |

(Continued)

OTHER PUBLICATIONS

"Visualize Your Plans with Wrike's Enhanced Calendar Integration", Retrieved From https://www.wrike.com/blog/visualize-your-plans-with-wrikes-enhanced-calendar-integration/, Oct. 1, 2015, 5 Pages.

(Continued)

*Primary Examiner* — Marcos Batista
(74) *Attorney, Agent, or Firm* — Shook, Hardy & Bacon L.L.P.

(57) ABSTRACT

Aspects of the technology described herein provide visual representations of future user events for improved graphical user interfaces and improved computing services provided to a computer user. In one particular embodiment, using the one or more sensors, information about a current event, which may include a current location of the user, is determined. Based on at least the current event, a prediction of future events or event patterns in association with the user is determined. Each user event pattern can include one or more future events, such as activities, meetings, or location visits, corresponding with the user. Thereafter, the user event patterns can be presented via a graphical user interface. Each user event pattern can be visually represented as a sequence of events in which the user might partake over a timeframe, and may include a corresponding probability of the user's likelihood of partaking in the event.

20 Claims, 8 Drawing Sheets

(56) References Cited

U.S. PATENT DOCUMENTS

| | | |
|---|---|---|
| 2013/0151302 A1 | 6/2013 | Kho et al. |
| 2014/0316835 A1 | 10/2014 | Cortes et al. |
| 2015/0178690 A1 | 6/2015 | May et al. |
| 2018/0005194 A1 | 1/2018 | Dotan-cohen et al. |
| 2018/0232706 A1* | 8/2018 | Zhang ................. G06Q 10/1095 |
| 2018/0300641 A1* | 10/2018 | Dong ..................... G06N 5/047 |

OTHER PUBLICATIONS

Hartl, Philipp Rudolf, "Visualization of Calendar Data", In Thesis of Vienna University of Technology, Oct. 2008, 84 Pages.

MacKinlay, et al., "Developing Calendar Visualizers for the Information Visualizer", In Proceedings of the 7th annual ACM symposium on User interface software and technology, Nov. 2, 1994, 10 Pages.

"International Search Report and Written Opinion Issued in PCT Application No. PCT/US2019/033022", dated Jul. 11, 2019, 11 Pages.

\* cited by examiner

USER EVENT PATTERN PREDICTION AND PRESENTATION

BACKGROUND

Electronic calendars are oftentimes used by individuals to structure, plan, and organize their time. Many users have multiple events throughout a day and even multiple events scheduled at the same time. Typically, the events are presented in a calendar view in association with the corresponding time and overlapping events are both presented at the same time. The events presented via the electronic calendar, however, are a linear listing of scheduled events, but not necessarily ones in which the user attended or will attend. As such, understanding the various events presented in an electronic calendar can be difficult and confusing.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in this disclosure are directed towards systems and methods for determining user events, routines or event patterns (any of which may be referred to herein as "event patterns"), and presenting such information in an effective manner. For example, in an embodiment, a user's event pattern may represent a possible future event or sequence of possible events the user is likely to attend or do. These future event patterns sequences may be determined and may be graphically presented to the user, such as within a calendar computer application or utilized by one or more computing services or routines to improve the user's computing experience. Generally, future user event patterns can be predicted or inferred, as described herein, using current event information (e.g., a current location of a user or other contextual information) and/or historical event data. In some embodiments, determining a future user event pattern includes utilization of an event prediction model, such as a Markov Model. As event patterns can be complex (e.g., if a user attends X, the user will attend Y, but if the user attends A the user will not attend B), embodiments described herein further provide technologies for presenting such predicted user event patterns. For instance, in various implementations, predicted event patterns can be presented in a probability dependency graph form, in a marginal density chart form, and/or in an electronic calendar form.

BRIEF DESCRIPTION OF THE DRAWINGS

Aspects of the technology described in the present application are described in detail below with reference to the attached drawing figures, wherein.

DETAILED DESCRIPTION

Figure 1:
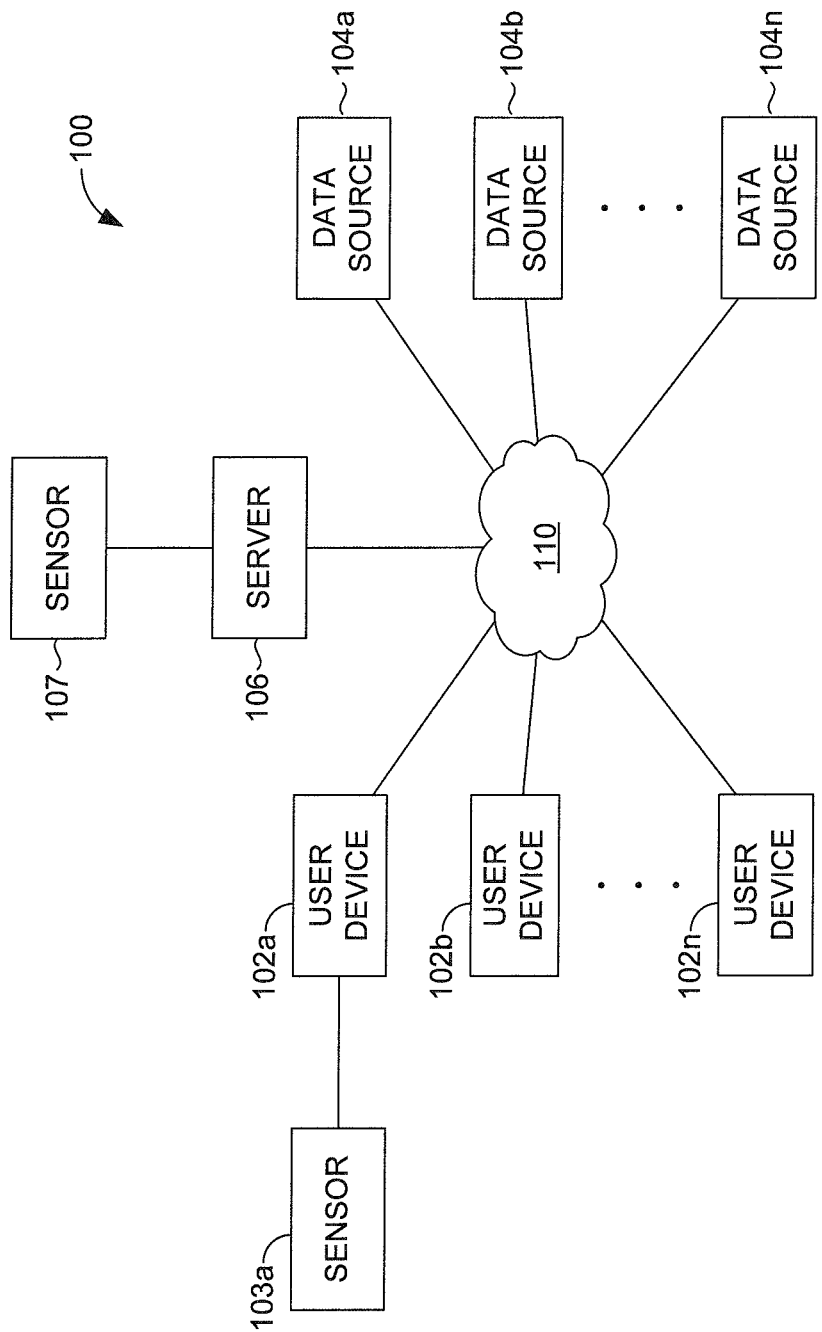
FIG. 1 is a block diagram of an example operating environment suitable for implementing aspects of the disclosure.

The subject matter of aspects of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are directed towards systems, methods, and computer storage media for, among other things, predicting and presenting future user events, routines, or event patterns. For example, a user's event pattern may represent a possible future event or sequence (or sequences) of possible future events that the user is likely to attend or do. Examples of events may include activities performed or participated in by the user, meetings, scheduled items or calendar entries, tasks, visitations to locations, or other events associated with the user or in which the user might partake (e.g., items that appear in calendars just as FYI, such as out of office events, family items, classes, or the like). People tend to have such items as well: from kids plans/classes to OOF events that colleagues send for them to be aware of). These future events may be determined and may be graphically presented to the user, such as within a calendar computer application or utilized by one or more computing services or routines to improve the user's computing experience. Thus, in one aspect, sequences of future events may correspond to probabilistic options of future events that a user may perform, or may indicate the future event(s) the user is likely to perform.

Embodiments may determine a likely future event (or likely sequence(s) of future events) for a user, which may include determining contextual or semantic information. Some embodiments may further determine a structure for presenting this information, which may be based on a Markov Model. By way of example and not limitation, using a Markov Model, a set of one or more user event patterns may be represented as a tree, wherein each node of the tree is a specific pattern behavior. Further, in such embodiments, the edges of the tree can represent or indicate a stochastic nature of the sequence or series of user events; for instance, which event the user will do or attend, from the current information, such as the user's current behavior or current contextual information (e.g., the location of the user). This information then may be provided to a computing application or service, such as a personal digital assistant service (or virtual assistant) associated with the user, a consumer application, such as a user calendar application, a scheduler application, or recommendation service, for instance, or may be provided via an application programming interface (API) so that it can be utilized by a third-party application or service.

In particular, in various embodiments described herein, user event pattern predictions may be presented in an effective manner so as to convey various likelihoods of the user's attending or performing the future events. Examples of the various implementations for presenting the event pattern predictions discussed herein include a probability dependency graph, a marginal density chart, and a calendar view. Such visual presentations can indicate expected events in which the user is expected to partake and, in some cases, probabilities associated therewith. In some aspects, as a user progresses through time (e.g., a day), a pattern prediction and presentation thereof can be adjusted to accommodate the current events in which the user is partaking or expected to partake. For example, assume a user travels to a new location. Based on the user's new location, the predicted events, and/or corresponding probabilities of the user's likelihood of partaking in future events, may be modified. For instance, it may be inferred that the user is less likely to partake in a future event at the old location versus a different future event at the new location. In this way, embodiments of the disclosure are able to provide a high accuracy and dynamic, up-to-date nature to predicting a future event associated with a user.

By effectively representing a user's likely behavior or participation (or association) with future events, a user is better able to understand a sequence of events and probabilities associated therewith. For example, in a conventional electronic calendar system, a user views a listing of events, but such events are not prioritized or presented in a manner that reflects a set of events in which the user likely will participate or has an option to participate. In particular, one problem with the graphical user interfaces (GUIs) of conventional calendar and scheduling computer programs is that they present user events in a linear form and are thus incapable of conveying the stochastic nature (a random probability distribution or pattern) of a user's routine. Moreover, these conventional calendar and scheduling GUIs are unable to present complex options of future user activity. For instance, where there are two possible sequences of future events for a user, such as either (1) go to the gym and then go home, or (2) go straight home, conventional calendars and scheduling applications are unable to present such information to the user. Another problem with the representations of future events provided by these conventional GUIs is that they lack structure, and thus cannot be updated or annotated with contextual information to provide a coherent visualization of the user's future events. For instance, even if we know that the user has a fifty-percent chance of going to the gym after work on Mondays, it would be difficult to update this probability given contextual information indicates that it is a Monday and that the user arrived to the office very late today. (Thus, the user may be more likely to stay longer at the office and then to go directly home, for example.)

In contrast, embodiments described herein provide an improvement to GUIs by determining a structure that enables a user to view events likely to be attended and, in some cases, the corresponding probabilities. Further, in some cases, understanding and presenting the more likely event pattern(s) can reduce the amount of data presented on the GUI thereby increasing usability, particularly on a mobile device. In addition to providing more effective information to a particular user, other users may also find the predictive information valuable (e.g., to plan whether an individual will be at a particular event). Further, such information can be used by applications or services to provide more accurate and/or timely information. For example, assume a user is predicted to leave work, go to the gym, stop at the grocery store, and then go home. In such a case, a timely notification can be generated and provided to remind the user to purchase certain items at the store. Similarly, where it is determined that a user is unlikely to attend a particular future event option (for instance, where current or other contextual information indicates the user is in a different location or has changed from his routine, like arriving late to work), then a virtual assistant service may recommend rescheduling or cancelling the event, the event may be automatically removed from the user's calendar, or the presentation of the event on the user's calendar or scheduling GUI may be modified so as to indicate the low probability of attendance. For example, the event may be displayed in a grayed out or reduced size format indicating that it is possible but unlikely that the user will attend the event or partake in that event option.

Accordingly, at a high level, in one embodiment of the technologies described herein, user data and/or contextual data is obtained from one or more data sources. The user data and/or contextual data may be received by collecting such data with one or more sensors or components on user computing device(s) associated with a user. Examples of such data, which is further described in connection to event-data collection component 210 of FIG. 2, may include location information of the user's computing device(s) ("user device(s)"), user-activity information (e.g., app usage, online activity, searches, calls, or other user device interactions), application data, contacts data, calendar and social network data, or nearly any other source of data that may be sensed or determined by a user device or other computing device. As further described herein, the obtained data may be used for determining current contextual information or a current user behavior, such as a current event in which a user is partaking (e.g., a visit at a location). In one embodiment, user location history information from previous visits to the current location, as well as received user data, may also be used to facilitate determining the current event or predicting future events, as described herein.

Upon identifying current user behavior, such as a current event for the user, the current event, contextual information, and/or historical data can be used to predict subsequent events for the user. As used herein, a current event may comprise information about the location and/or action (i.e., behavior) being currently performed by a user, or in some cases, may be the most recent location and/or action detected as performed by a user. A graph can be generated in a GUI and used to depict the various predicted future user event patterns.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1000 described in connection to FIG. 10, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 10 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
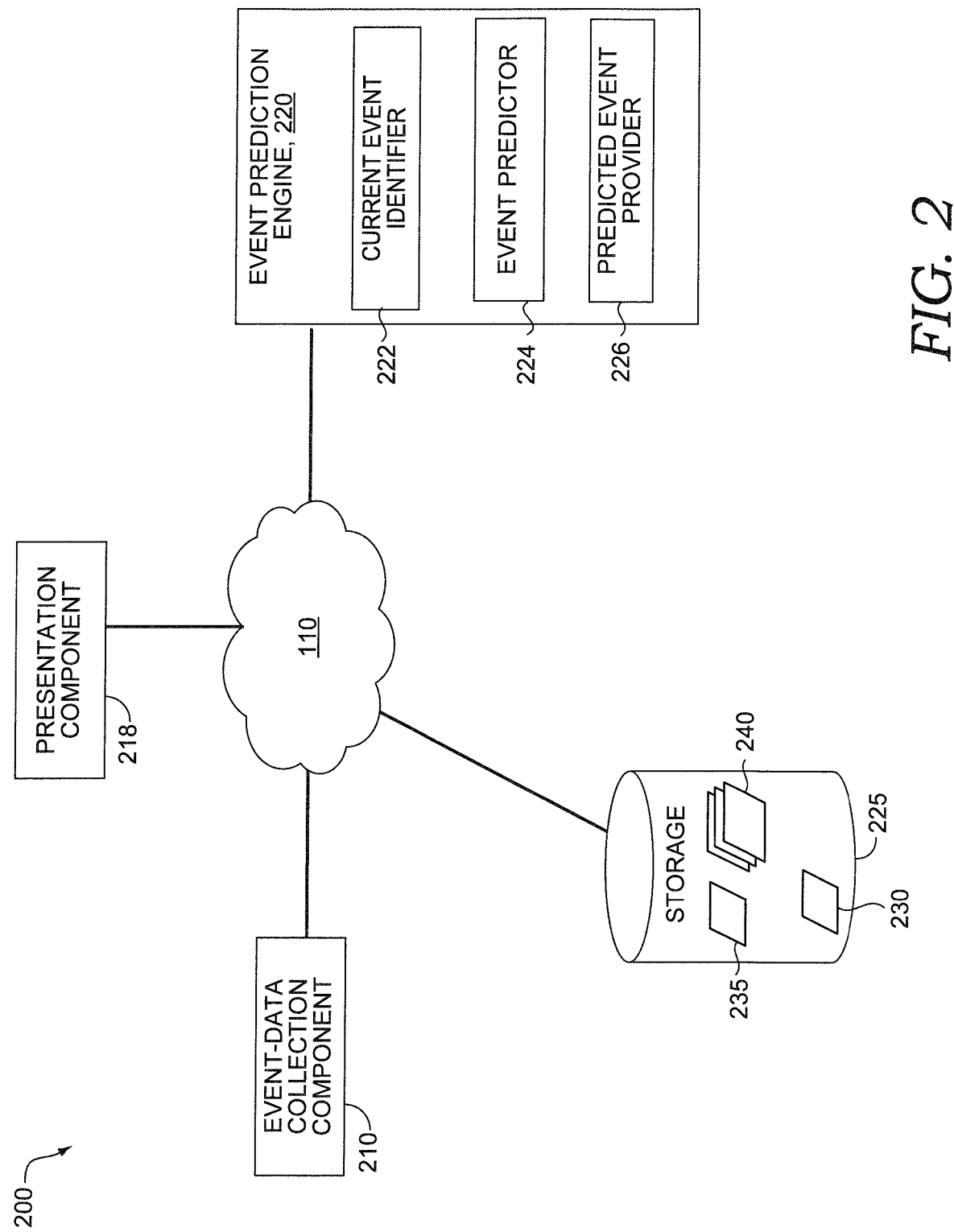
FIG. 2 is a diagram depicting an example computing architecture suitable for implementing aspects of the disclosure, in accordance with embodiments described herein.

Operating environment 100 can be utilized to implement one or more of the components of system 200, described in FIG. 2. Operating environment 100 also can be utilized for implementing aspects of process flow 600, 700, 800, and 900 described in FIGS. 6-9, respectively. Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including event-data collection component 210, presentation component 218, event prediction engine 220, and storage 225. The event-data collection component 210, presentation component 218, and event prediction engine 220 may be embodied as a set of compiled computer instructions or functions, program modules, computer software services, or an arrangement of processes carried out on one or more computer systems, such as computing device 1000 described in connection to FIG. 10, for example.

In one embodiment, the functions performed by components of system 200 are associated with one or more personal digital assistant (sometimes referred to as "virtual assistant") applications, services, or routines. In particular, such applications, services, or routines may operate on one or more user devices (such as user device 104a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, event-data collection component 210 is generally responsible for accessing, receiving, and determining event data. Event data generally refers to any type of data that is related to or can be associated with an event. In some instances, an event may correspond to an occurrence or happening at a time and/or place in which a user may participate or be present. For example, an event may be a visit by a user to a particular location at which a user is present (e.g., home, work, a store), a task or activity being performed (e.g., team meeting, brainstorming session, clean house), or the like. As such, event data may include user data that provides information associated with a user and/or contextual data that provides context to the user and/or the event, described in more detail below. Event data can be obtained from one or more data sources, such as data sources 104*a* and 104*b* through 104*n* of FIG. 1. Additionally or alternatively, event data can be derived or determined, some examples of which are provided below.

In some embodiments, event-data collection component 210 may be employed to facilitate the accumulation of user data of a particular user (or in some cases, a plurality of users including crowdsourced data) and/or the accumulation of contextual data. The data may be received or accessed, and optionally accumulated, reformatted and/or combined, by event-data collection component 210 and stored in one or more data stores such as storage 225, where it may be available to the components or subcomponents of system 200. For example, the user data may be stored in or associated with a user profile 240, as described herein. In some embodiments, any personally identifying data (i.e., user data that specifically identifies particular users) is either not uploaded from the one or more data sources with the user data, is not permanently stored, and/or is not made available to the components or subcomponents of system 200.

Event data may be obtained from a variety of sources where the data may be available in a variety of formats. For example, in some embodiments, event data obtained via event-data collection component 210 may be determined via one or more sensors (such as sensors 103*a* and 107 of FIG. 1), which may be on or associated with one or more user devices (such as user device 102*a*), servers (such as server 106), and/or other computing devices. As used herein, a sensor may include a function, routine, component, or combination thereof for sensing, detecting, or otherwise obtaining information, such as user data, from a data source 104*a*, and may be embodied as hardware, software, or both.

User data may be any type of data associated with a user, such as user location, user activities, user interactions, user preferences, user calendar items or data, etc. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), calendar items specified in user's electronic calendar, and nearly any other source of data that may be sensed or determined as described herein.

Examples of data that indicate location information include data from GPS, wireless communications (e.g., cellular or Wi-Fi Access Point), IP addresses associated with current user activity, user check-in/social-networking information, or other user data from which location information may be determined. In some embodiments, locations indicated by the location data may be clustered and the dense clusters used for determining those locations wherein a user spends time (e.g., hubs). Further, in some embodiments, filtering can be performed to remove location information outliers (e.g., a Wi-Fi-derived location data point from 300 yards away suggesting that the user is at that location); clustering; or other means to determine location data. Embodiments may determine current location and may also perform location determination with historic location data associated with the user (such as logged user data or logged location information, which may be stored in a user profile such as historic location data in a user profile).

User data can be received by event-data collection component 210 from one or more sensors and/or computing devices. While it is contemplated that the user data is processed, by the sensors or other components not shown, embodiments described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some embodiments, event-data collection component 210 receives or accesses user-related data continuously, periodically, or as needed.

Contextual data obtained by the event-data collection component 210 can be any type of data that provides context to user activities, user location, and/or events. In some embodiments, contextual information related to a user or event is obtained or determined, such as related entities (e.g., other people present at the location), a venue or venue-related information about the visit, or detected activity performed by the user at the location. By way of example and not limitation, contextual data may include information about the location, such as venue information (e.g., this is the user's office location, home location, gym), time (including, for instance, arrival/departure times or duration of stay), day, and/or date, which may be represented as a time stamp associated with the event, other user activity preceding and/or following the event, other information about the event such as entities associated with the event (e.g., venues, people, objects), information about other users associated with the event (for example, if the event is a meeting, then the other invitees/attendees of the meeting), information detected by sensor(s) on user devices associated with the user that is prior to, concurrent, or substantially concurrent to the event, or any other data that can provide context and facilitate identification of user event pattern prediction.

Contextual data can be received from any number of devices and determined in any manner. For example, in some embodiments, contextual data can be derived using user data and/or other contextual data. Contextual data also may be determined from the user data of other users present during the visit, in some embodiments, in lieu of or in addition to user data for the particular user. Contextual data may be stored as a related set of contextual information associated with a user and/or an event, and may be stored in a profile, such as in user profile 240.

In embodiments, as user data and/or contextual data can be related to a user's user devices, a particular user device may be identified in association with a user by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine location information or contextual information about the devices. This information may be used for determining a label or identification of the device (e.g., a device ID) so that contextual information about a particular event captured on one user device may be recognized and distinguished from data captured by another user device. Where two or more user devices associated with a user are in different locations, data logic 235 (as described below) may be used to reconcile the location data and determine the most probable location of the user. In some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As previously described, in some cases, user data and/or contextual data can be determined and derived. As such, data logic 235 may be utilized for determining event data, such as user data and/or contextual data. Data logic 235 may include rules, conditions, associations, classification models, or other criteria to identify a contextual or user information. For example, in one embodiment, data logic 235 may include comparing criteria with the user data in order to determine that a user has been located at a particular location for a certain period of time. The data logic 235 can take many different forms depending on the mechanism used to identify particular context or user data. For example, the data logic 235 may comprise training data used to train a neural network that is used to evaluate user data to determine when a visit has occurred, or when particular features are present in a determined visit. The data logic may comprise static rules (which may be predefined or may be set based on settings or preferences in a user profile associated with the user), Boolean logic, fuzzy logic, neural network, finite state machine, support vector machine, logistic regression, clustering, or machine learning techniques, similar statistical classification processes, other rules, conditions, associations, or combinations of these to identify an event and/or event feature from user and/or contextual data. For instance, data logic may specify types of user device interaction(s) information that are associated with an event, such as launching a fitness tracking app which may occur at a gym, navigating to a website to read a movie review, or composing an email.

In one embodiment, data obtained by event-data collection component 210 may be stored as one or more label(s), tag(s), or metadata associated with a user and/or event. In one implementation, event data may be stored in a user profile 240 associated with a user and/or event. In some embodiments, event-data collection component 210 may associate data with the related user and/or event and may also log the data in association therewith. Alternatively, the association or logging may be carried out by another service.

Continuing with FIG. 2, event prediction engine 220 is generally configured to determine or predict one or more possible future events (or sequence(s) of future events) associated with a user, also referred to herein as event patterns or user event patterns. That is, the event prediction engine 220 can identify a set of events that a user is likely to attend or participate in in the future. As shown in example system 200, event prediction engine 220 comprises current event identifier 222, event predictor 224, and predicted event provider 226. At a high level, embodiments of event prediction engine 220 receive or access event data, such as user data and contextual data, and utilize this information to generate a pattern-based prediction of a next or future event(s) for the user. In some embodiments, a corresponding confidence is also determined for the prediction(s). Further, the prediction may comprise a single event, a sequence of events, or probabilities for multiple events. For example, an eighty percent likelihood that the next event will be the user's visiting a gym and a twenty percent likelihood that the next event will be arriving at the user's home.

The current event identifier 222 is generally configured to identify a current event associated with a user. That is, the current event identifier 222 can determine (or identify) an event of which the user is participating or involved. Generally, an identification of a current event can enable prediction or identification of future events likely attended by a user. By way of example only, assume a user is at home instead of at work. In predicting future events, it is more likely that a user will have lunch near home than the user having lunch at a work dining location. As another example, assume a user is visiting a gym and has an immediately following appointment scheduled at an upscale restaurant at a significant distance from the gym. Because the user is identified as being at the gym, it is unlikely the user will be attending the immediately following dinner that is a significant distance away.

As described, embodiments may use user data and/or contextual data, including location information, to determine a current event engaged in by a user. In this regard, the current event identifier 222 might identify a location of the user, an activity of the user, and/or the like. A current event corresponding with or associated with a user (e.g., for which a user is participating or engaged) can be identified in any number of ways.

In implementation, a current event may be determined using data identified from the collected user data and/or contextual data (including current and/or historical data). As described, a current or recent location of a user can be used to identify a current event, that is, where a user is located, what a user is doing, etc. By way of example only, assume a user is identified as being located at a specific address known to be the user's place of work. In such a case, recognizing that the user is positioned at the work place enables identification that the current event includes the location of work. In some cases, a current location of a user can be designated as the current event. In other cases, a current event may include a task or activity in which the user is involved (e.g., participating in a meeting, attending a concert).

In some embodiments, the current event identifier 222 may use the current location of the user to identify a current event. For example, as described previously, user data indicating that a user was in the same approximate geographical location for a period of time may indicate participation in an event occurring at that location. In particular, in one embodiment, events may be identified by concatenating consecutive (or substantially consecutive) user location data indicating the user is near the same approximate location, and in some cases filtering out outliers. For instance, location information can be monitored continuously, periodically, or as needed. In some cases, the monitored location information may have corresponding timestamp for when the location information was sensed or otherwise determined. Thus, a collection of location-time data may be determined that includes data points indicating a location (which may be a geographical location or semantic location) and a corresponding time that the location was detected. In some embodiments, the location-time data comprises a time series of location information. Accordingly, in some embodiments, an event may be determined based on concatenating consecutive (or approximately consecutive) data points in the time-series that indicate the same approximate location. In some embodiments, the location-time data may be stored in current event data in association with a user.

A current event may be determined based on an amount of time at a particular location. For example, user data indicating that a user was in the same approximate geographical location for a period of time is more likely to imply an event occurred than user data indicating the user was only at a particular location briefly (such as in the case where a user is driving by a location, but not visiting it.) In some embodiments, an event may be determined where a user remains approximately at the same geographical location over a time frame. In contrast, merely passing through a current location or momentarily being at a current location may indicate that an event has not occurred at the current location.

User location history information associated with previous visits to the current location may also be used for determining a current event, in some embodiments. In this regard, the current event identifier 222 may determine a current event, for example using one or more historical events, such as historical visits to the same location as the current visit. In this regard, a current location associated with a user can be compared to other previous events indicated as having that same location. For example, a particular user location can be compared to locations at which a user has previously been located to identify a match of location. Based on the match of a location, a current user event can be determined, such as grocery shopping at a particular grocery store. As another example, based on a user location that matches a work location, it can be determined the current event includes the user being at work.

Further, in an embodiment, location history information about where a user just came from (the user's previous location) is used for facilitating current location identification, such as where disambiguation is used to identify current location. For example, where user location history information indicates that the user was previously at a restaurant, and current location information indicates the user is at another geographic location that has a coffee shop and a restaurant, then it may be determined, using disambiguation, that the user is more likely at the coffee shop than at another restaurant.

In addition to location data, other user data and/or contextual data can be used to identify a current event. For example, user data indicating user interactions may be used to identify a specific task a user is performing, which can then be identified as a current event (e.g., in association with user location). For instance, while a user is located at the office, user interaction indicating a voice call (e.g., signals from an Internet connected telephone or computer telephony application, such as Skype) can be used to determine the user is participating in a voice call. As yet another example, other users' data in combination with a particular user's location may be used as an event at which the user is present. For instance, when other users are identified as participating in an event and a user is located in the same or similar location, the event can be identified as the user's event. As can be appreciated, any amount of user data and/or contextual data may be applied and used to identify a current event.

The event predictor 224 is generally configured to predict an event or sequence of events corresponding with a user. In this regard, the event predictor 224 can predict a user event pattern including one or more events in which the user may attend. Generally, the event predictor 224 utilizes event data, such as user data and/or contextual data, to predict user event patterns. At a high-level, and in some implementations, the event predictor 224 can utilize the identified current event to predict an event or sequence of events. As previously described, using a current event associated with the user can provide an indication as to which set of events the user may subsequently be present.

An event or sequence, or pattern, of events can be predicted in any number of ways. In some cases, features or data associated with a current event and/or historical events can be used to predict future events. In this regard, the event predictor 224 can determine features in the historical events that are similar to features in the current events (put another way, context(s) of historical events that are similar to the current event (e.g., the current user and/or contextual data)). The set of historical events similar to the current event, or features associated therewith, may be used as inputs to an event prediction model, as described further below.

Any type and number of features can be identified in association with events (e.g., current events and/or historical events) for use in event prediction models. For example, in some cases, periodic features and/or behavior features may be identified or determined. Periodic features comprise, for example, features of events that occur approximately periodically; for example, events occurring on the same particular time(s) of day, day of the week or month, even/odd days (or weeks), monthly, yearly, every other day, every $3^{rd}$ day, etc. Behavior features comprise user behaviors such as arrival time, length of stay, user activities (e.g., user behavior) occurring during the event, previous location visited before the current location (or sequence of previous locations visited, such as the sequence of the last K locations the user visited prior to current visit (or historic visit)), for example, as well as uncommon or out-of-routine features (such as features indicating the user is at home on a workday (which may occur infrequency such as when the user is sick)) or features associated with a location that the user rarely visits, such as a city on another continent. Some such additional examples include a user usually goes to the gym after work on days that the user has a major meeting that day at work; similarly a user usually does not go to the gym after work when the user arrives to work late, and instead typically works later.

In some embodiments, event sequence similarity can be used (e.g., the sequence of the last K events in which the user partook prior to current event (or historic event) using an Event Sequence Match feature, which determines the Levenschtein distance between the historical event (the observed visit) and current event sequences). In embodiments, other features patterns may be utilized, such as feature similarity between the presence of other people at the current event and historical events (e.g., contacts or social media acquaintances of the user), similarity of activity conducted by other people detected at the current events and historical events, similarity of events determined to be occurring at the current events and historical events, or similarity of any other aspect, feature, or context associated with a current event and historical event.

Upon identifying features, such event features may be used as inputs to an event prediction model. In some cases, the features input to an event prediction model may be features associated with a current event (e.g., user's current location). In other cases, features associated with a current event as well as features that may be similar (e.g. in association with a past event(s)), may be used as input to an event prediction model. That is, the features and/or set of historical events similar to the current event may be used as inputs to an event prediction model.

An event prediction model may include one or more predictor programs or routines ("predictors") for predicting a next or future possible event or set of events associated with the user, for example, based in part on feature patterns of similarity (e.g., behavior and periodic features) between a current event and a set of historical events. At a high level, an event prediction model can utilize current and historical event information (e.g., features) and determine a prediction about the next (or future) user event. In embodiments, an event prediction model comprises a Markov Model, which may use a first-order or second-order prediction of historical events to determine the likely future event. For example, the event predictor 224 can employ a Markov Decision Process (MDP) or Markov chain framework to model predicted events and/or a user's likelihood of partaking in the future events. These embodiments may be particularly appropriate for scenarios where a user has a plurality of future event sequences (or options of one or more events, which may be mutually exclusive), e.g., going to the gym and then going home, or just going straight home. Thus, for instance, a Markov Model may use utilized to provide a likelihood of a user performing a sequence of events. In some embodiments, event predictor 224 may determine a statistical relationship or structure representing possible future events of the user, based on a Markov Model. For example, in an embodiment, user events may be modeled as a tree (see e.g., FIG. 3).

In one embodiment, the event predictor 224 may use the feature similarity determinations to filter out historical events and/or retain those historical events that have a particular feature (or features) in common with the current event. Thus, in one embodiment, an event prediction model may be designed (or tuned) for determining a prediction based on a particular feature (or features) or feature type. For instance, there might be an event prediction model used for determining predictions when the feature indicates a workday, or weekend, or Monday, a holiday, or arrival time, or length of stay, etc. Such a predictor may utilize those historical events having the features (similar to the current event) corresponding to its particular prediction model. These algorithms or models may be stored as prediction algorithms 230 in storage 225.

Accordingly, in some embodiments, the event predictor 224 can perform events filtering to determine a set of historical events that are relevant to that particular predictor. More specifically, event filtering may be performed such that an event predictor model may receive a subset of historical events with features that correspond to its prediction criteria. For instance, an event prediction model for determining a location prediction based on behavior features similar to 'arrival time to work later that is than normal' receives a set of historical events where the user arrived late for work; thus, each event in this particular historical subset includes similar features for the location (here, work) and arrival time. In this way, each event prediction model may utilize a set of historical events that are similar to the current event, based on at least one in-common feature between the historical events and current event.

In some cases, event filtering may be based on similarity scores. Generally, features in the current event and the subset of historical events can be compared, and a similarity score indicating an extent of similarity can be determined. In some implementations, not only those features used for determining the subset of historical events (e.g., a weekday or arrival time) may be scored, but all (or a larger number) of features available in the current and historical events for comparison. In some embodiments, a Boolean logic process is used (i.e., the features have to be true or have the same or similar pattern, and if this is satisfied, then a statistical difference between the particular features is determined). The differences may include, for example, differences in the arrival times, length of stay, sequence distances, etc. In an embodiment, these differences are determined and put into a sigmoid. Further, in an embodiment, a similarity threshold is used, which may be predetermined, tunable, or adaptive, or may be initially set to a value based on a population of users, may be based on empirical information learned about the particular user, for example, or may be adaptive based on the number of historical observations. In one embodiment, the threshold is 0.5 (i.e., just over fifty percent, meaning more similar than dissimilar). In another embodiment, the threshold is initially 0.6 or 0.8. The threshold may be used to determine whether a particular historical event is "similar enough" to the current event so as to be considered for determining a prediction. In some cases, it may be necessary to perform some further filtering or a selection of features for the similarity comparison, such as where, for a given day, a user has more than one arrival time feature (e.g., the user arrived at work twice, because they left work for lunch and then returned). Here, it may be determined that the arrival time in the morning should be used for comparison with the current event. In some embodiments, a vector representing the similarity differences (or similarity score) may be determined and utilized.

The similarity score can then be used to identify or select historical events that are most similar (or similar enough, based on a threshold) to a current event. In some embodiments, a threshold can be used to identify event scores that satisfy the threshold, and are thus similar enough to be used for determining a prediction of a future event. These selected or identified events may be referred to herein as example events used for event prediction.

Using identified historical events with similar features, or pattern of features, as a current event, the event predictor 224 can predict a user's next or future event (or locations). As described, in embodiments, an event prediction model or set of event prediction models can be used to predict user event patterns. For example, as described herein, an event prediction model may comprise or utilize a Markov Model or Markov process.

In some embodiments, a prediction probability corresponding to each predicted event within a user event pattern may be determined. The prediction probability may indicate a degree or likelihood that the prediction will occur, or in other words, the chances that the user will partake in the predicted event. As described below, in some embodiments, the prediction probability associated with a prediction may be used to select a particular prediction from other predictions. Thus, the output of an event prediction model is a predicted next or future event (or events), and in some cases corresponding contextual information, such as departure time, arrival time, length of stay, etc., and/or a prediction probability corresponding to the predicted next or future location (or locations).

The event predictor 224 can determine a prediction(s) from among a set of predictions determined by various event prediction models. In some cases, one predicted user event pattern may be identified and, in other cases, multiple predicted user event patterns may be identified. In an embodiment, an ensemble process is utilized, wherein the predictors vote or weigh in, and a selection is determined based on the ensemble member predictors. Further, in some embodiments, individual ensemble member predictors may be weighted based on learned information about the user or of the events. In some embodiments, a particular prediction that higher or a threshold level of corresponding prediction probability is selected as the resultant next (or subsequent) predicted event (or events). This selected future event may be considered a pattern-based (or history-based) prediction. As described, any number of user event patterns may be predicted. In some embodiments, the identified predicted user event patterns may be stored in user profile 240.

In some cases, the event predictor 224 may take into account explicit information associated with the user. For instance, suppose a pattern-based prediction determines that a user is likely to go straight home after leaving the office. Thus, the predicted next event in this example is the user's home. But suppose the user has a confirmed appointment after work to see a doctor, which may be indicated in the user's calendar. Then, it may be determined that the user is likely to go to the appointment next (e.g., the location of the doctor's office), rather than go home. As such, a pattern-based prediction can, in some cases, be overridden.

Explicit signals may be determined in any number of ways. The term "explicit signal" as used herein refers to a piece or stream of explicit information and does not refer to the communication transmission. In some embodiments, an explicit signal may be determined based on information determined about the user for a future time corresponding with the pattern-based prediction(s). As an example, an explicit signal may indicate that the user has a calendar appointment with a doctor at a future time in which a pattern-based prediction has predicted the user to be at another event (e.g., the user's home). Explicit signals may be determined from user data and/or contextual data. For example, explicit signals may be determined from, by way of example and not limitation, calendar information; social media activity (which may include invitations to events, or posts or tweets about appointments or events affecting the user's schedule or location); emails (such as an email confirming booking a flight); SMS text messages (such as a text message about an appointment), voicemail, calls, and other communication; user-device interactions, including website activity (such as visiting a restaurant's website and making a reservation at the restaurant), user-purchase transactions (such as a transaction indicating purchasing tickets to a concert); location information (as described below); detected out-of-routine events; or other external events information indicating possible future activity or location associated with the user. In some embodiments, the explicit signal may be determined by extracting and/or parsing location-related information from the user-data. For example, where an SMS text message (or other communication) indicates "I'll meet out at the mall at 8 pm today," information about the user's location (the mall) and a future time (8 pm, today) may be extracted and provided as an external, explicit signal. In one embodiment, crowd-sourced information may be used to determine an explicit signal, such as information from a user's close circle of friends or co-workers. For example, if most of the user's co-workers have the same event on their calendars, such as a "team party" with an address, then an explicit signal may be inferred. (This type of explicit signal may have a lower confidence than an explicit signal determined based on user-data derived directly from the user.)

In some embodiments, location information determined from a user device associated with the user may provide an explicit signal, such as location information indicating that the user's location or bearing (direction of travel) is such that it is unlikely or even impossible that the user will travel to the next event predicted by the pattern-based prediction. Although the pattern-based prediction may have been based on a current location of the user at the time of the prediction, this example could occur where the user suddenly departs the current location or when a user device now indicates the user is at the different location, for instance.

A level of confidence associated with each explicit signal may also be determined. The confidence may indicate a legitimacy or authority (e.g., strength) of the explicit signal; for instance, a higher confidence may indicate that the user's future activity is more likely to be affected according to the explicit signal. As an example, a meeting request received by a user that the user has affirmatively confirmed (accepted as attending), may have a higher confidence than a meeting request received by the user that the user has responded to as tentative or has not responded to at all (an unconfirmed conflict).

When it is determined that a conflict does not occur for a particular pattern-based prediction, then the explicit signal(s) may be ignored with regards to that pattern-based prediction, in an embodiment. But where it is determined that a conflict may occur, then the explicit signal(s) and pattern-based prediction are conflated (or reconciled) to determine a coherent predicted event. For example, an explicit signal indicating a user-accepted meeting over the exact time as a predicted next location of lunch at a restaurant, wherein the meeting is at a different location than the restaurant, may be determined has having a high level of conflict. Since the user accepted the meeting, the corresponding confidence may be high, and it may be determined that the next or future semantic event is the meeting, and further that the user will not go to lunch at the restaurant. As another example, suppose a user has just sent an SMS text message to a friend indicating that the user will stop by her friend's house on the way home today to pick up an item to borrow. A pattern-based prediction may have determined that the next event includes the user being at home; the user will arrive home at 6 PM, and will stay at home for 13 hours (until tomorrow morning, when the user goes to work). But an explicit signal, based on the text message, indicates that the user's next semantic event includes the user being at a friend's house. Because the user just sent the text message, a high confidence may be determined for this explicit signal. Accordingly, it may be determined that the user's next event is most likely the friend's house, but that a subsequent event is the user's home.

Continuing with FIG. 2, the predicted event provider 226 is configured to provide an indication of a predicted event or set of events. That is, the predicted event provider 226 can provide an indication of user event patterns. An indication of a predicted event or set of events can be provided to a user device, for example, via a computing application or computing service that consumes the predicted future event information regarding the user to provide an improved computing experience for the user. In some cases, an indication of a predicted event or set of events may be provided to a computing service that utilizes such event prediction. As described herein, predicted events may be provided to computer applications or services, which may include an aspect of a virtual assistant computer program associated with the user. In some embodiments, the prediction(s) may be provided in connection with an API to facilitate their utilization, for example, by calendar or scheduling applications or services, notification services, personalized content services, automation services, or other computing services that may be tailored to a user based on knowledge of the user's likely presence in association with a future event. Some embodiments may be carried out by a virtual assistant application or service, which may be implemented as one or more computer programs (which may comprise one or more applications, services, or routines), such as an app running on a mobile device and/or in the cloud, as further described herein.

In one embodiment, the content or indications provided by the predicted event provider 226 may include a notification, which may comprise information, a reminder, a recommendation, suggestion, request, communication-related data (e.g., an email, instant message), or includes similar content that may be provided to the user in a way that is personalized. For example, embodiments intelligently route user communications, schedule reminders, or provide notifications or other content to the user upon arrival (or just prior to or after arrival), departure (or just prior to or following a predicted departure), or at a time when the user would most likely desire to receive it. For example, upon determining that the user's next location is a grocery store, a reminder may be provided to buy milk, or a shopping list or coupon may be provided to the user. In some embodiments, based on a predicted future event, content may begin being loaded onto a user device for anticipated use at the future location.

In still another example, based on knowledge of the user's likely future event, anticipated travel time or a travel route from the user's current location may be determined. In some instances, a timely reminder to leave for the next location may be provided to the user, based on the anticipated travel time. Similarly, the user may be provided with a timely notification at a current location that an accident has occurred or a bridge is under construction along the route to the predicted future event.

In some embodiments, the predicted event provider 226 tailors content for a user to provide a personalized user experience. For example, predicted event provider 226 may generate a personalized notification to be presented to a user, which may be provided to presentation component 218. Alternatively, in other embodiments, predicted event provider 226 generates notification content and makes it available to presentation component 218, which may determine when and how (i.e., what format) to present the notification based on user data. In some embodiments, by tailoring content to the user or providing a personalized computing experience according to the predicted future event, user-device performance is improved, battery-life may be better managed, and bandwidth consumption conserved. For example, as further described above, content (such as a notification or reminder) may be provided to the user at a time when it is most useful or desired by the user, which may reduce the number of notifications needed. Similarly, automation services may be more precisely controlled based on knowledge of the user's future events.

As shown, example system 200 includes a presentation component 218 that is generally responsible for presenting content and related information to a user, such as the predicted events or set of events. Presentation component 218 may comprise one or more applications or services on a user device, across multiple user devices, or in the cloud. For example, in one embodiment, presentation component 218 manages the presentation of content to a user across multiple user devices associated with that user. In some embodiments, presentation component 218 may determine on which user device(s) content is presented, as well as the context of the presentation, such as how (or in what format and how much content, which can be dependent on the user device or context) it is presented, when it is presented, etc. In some embodiments, presentation component 218 generates user interface features associated with the personalized content. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

Predicted events can be presented in any number of ways, some of which are described herein. Predicted events can be presented via a graphical user interface in the form of text, graphs, charts, images, etc. In some embodiments, a set of predicted events may be presented in a linear or chronological representation. In such a case, a particular set of predicted events may be selected and presented. In other embodiments, multiple sets of predicted events may be represented. In this regard, various predicted user event patterns can be presented via a graphical user interface. As can be appreciated, predicted user event patterns can contain complex options (e.g., if the user does X, the user will do Y; however, if the user does A, the user will do B) as each future event may be conditioned on a preceding event, such as location, interaction, or behavior or the user. As such, user patterns can be difficult to present graphically to a user. For example, assume two possible sequences of events, such as either go to the gym and then home or go straight home, are predicted. Current calendars cannot present such possible sequence of events.

Accordingly, embodiments herein describe implementations for visually presenting user event patterns. In one implementation, to represent multiple sets of predicted events, a probability dependency graph may be generated and presented. A probability dependency graph can represent various paths or patterns of events that may be taken by a user. Stated differently, a probability dependency graph can depict various user event patterns. As one example of a probability dependency graph, a node can indicate a probability of each possible event at a certain time, conditioned on a current and/or previous event(s). Such probabilities can be determined in any number of ways, some of which were described above with respect to the event prediction engine 220.

In one implementation, a set of predicted user event patterns can be visualized as a tree, where each node represents a specific event, and the edges represent the stochastic nature of the process (which next event the user will pass to from the current event). In this regard, conditions or branches can be illustrated. This enables a visual representation of multiple possible sequences of events that may otherwise be difficult to visually represent.

Figure 3:
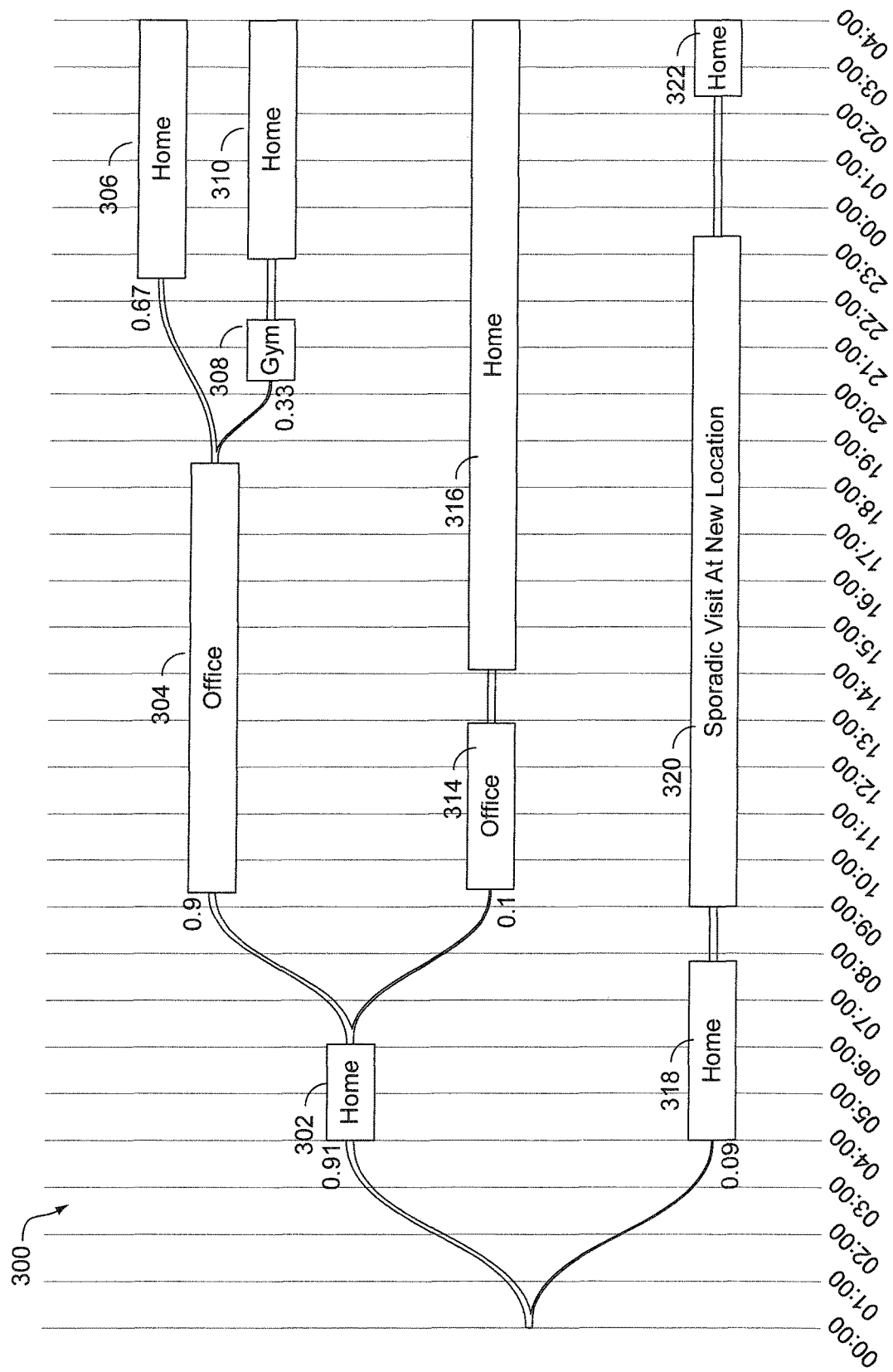
FIG. 3 provides a user interface providing one example of a probability dependency graph, in accordance with embodiments described herein.

FIG. 3 provides one exemplary probability dependency graph 300. Each of the paths represent a different branch, that is, a different schedule or path a user might take in a particular time frame (e.g., a day). In embodiments, the paths are mutually exclusive. As such, at any one time, a user can only take or be on one path. In addition to presenting various events, such as event 302, 304, 306, 308, 310, 312, 314, 316, 318, and 320, the probability dependency graph 300 also provides the probability of the user proceeding with each event. For example, as shown at item 302, there is a ninety-one percent chance (0.91 probability) the user will be at home and leave home for the office at approximately time 06:00 (or 6:00 am), and at item 318 there is a nine percent chance (0.09 probability) the user will remain at home until near time 08:00 (approximately 8:00 am), and then go to a new location (item 320).

As can be appreciated, such predicted events and associated probabilities can be updated as the time proceeds or as event information is determined (which may include contextual information and other information about a user's current behavior). In this regard, as current events at which the user is present change throughout a day, the subsequently predicted events and probabilities can be adjusted and presented as such. For example, assume at 10 am, the user is deemed to be located at the office location. In such a case, the events and probabilities presented can be adjusted to take that most recent information into account (e.g., remove the bottom set of events 316, 318, and 320 and adjust probabilities accordingly).

In another implementation, to represent multiple sets of predicted events, a marginal density chart may be generated and presented. A marginal density chart can represent various paths or patterns of events that may be taken by a user. In a marginal density chart, each interval can represent the probability of each possible event corresponding with a user at a certain time interval, which can be marginalized over historical events. Marginal densities can be determined by marginalizing the corresponding probability graph per time interval.

Figure 4:
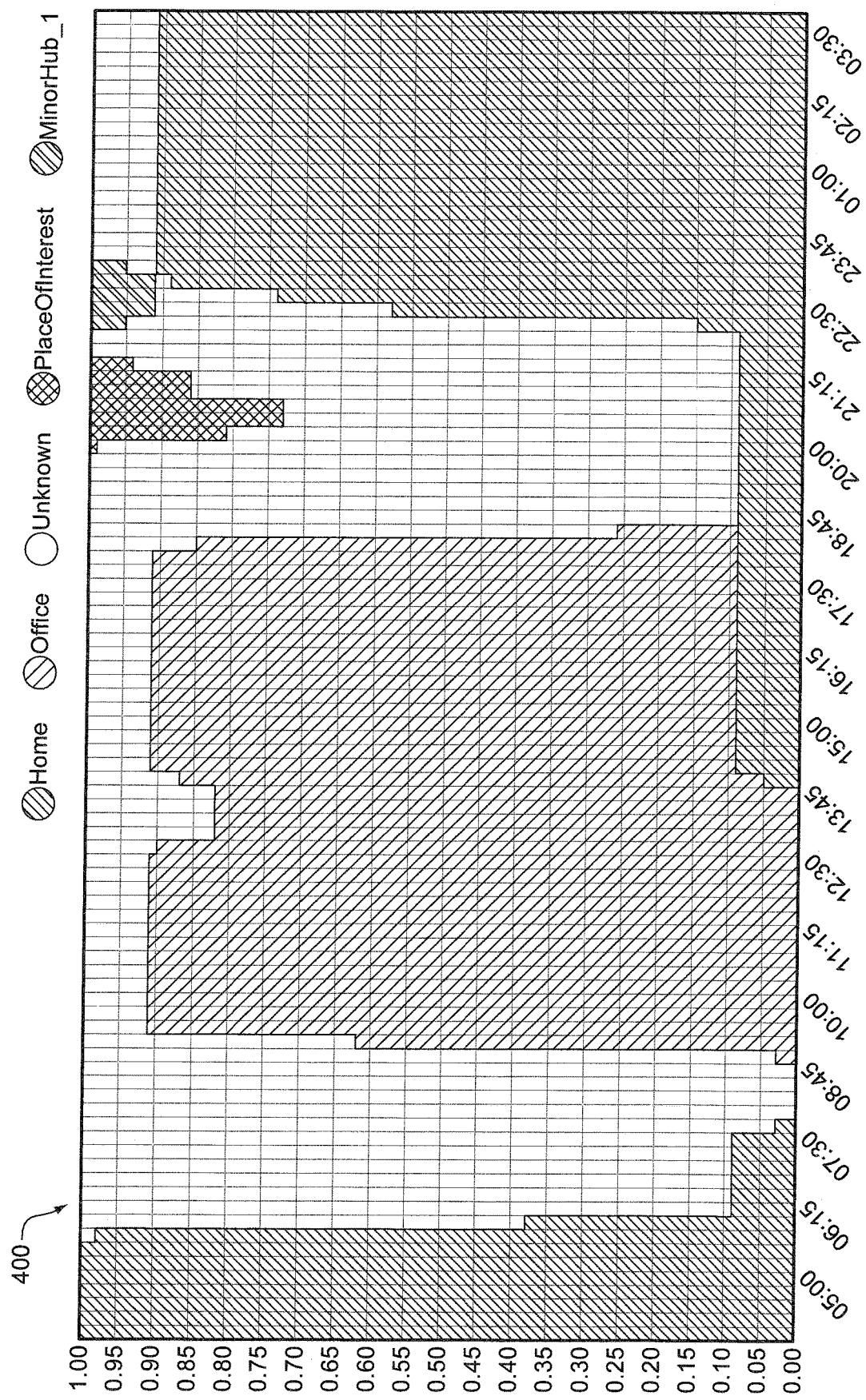
FIG. 4 provides a user interface providing one example of a marginal density chart, in accordance with embodiments described herein.

FIG. 4 provides an exemplary marginal density chart 400. In FIG. 4, each vertical bar signifies the marginal probability of the user's location (or event) at an aggregated time interval. For example, as shown in FIG. 4, at 3:00 pm, the marginal density chart 400 illustrates an approximately 10% probability the user is at home and an approximately 80% probability the user is working at the office.

Figure 5:
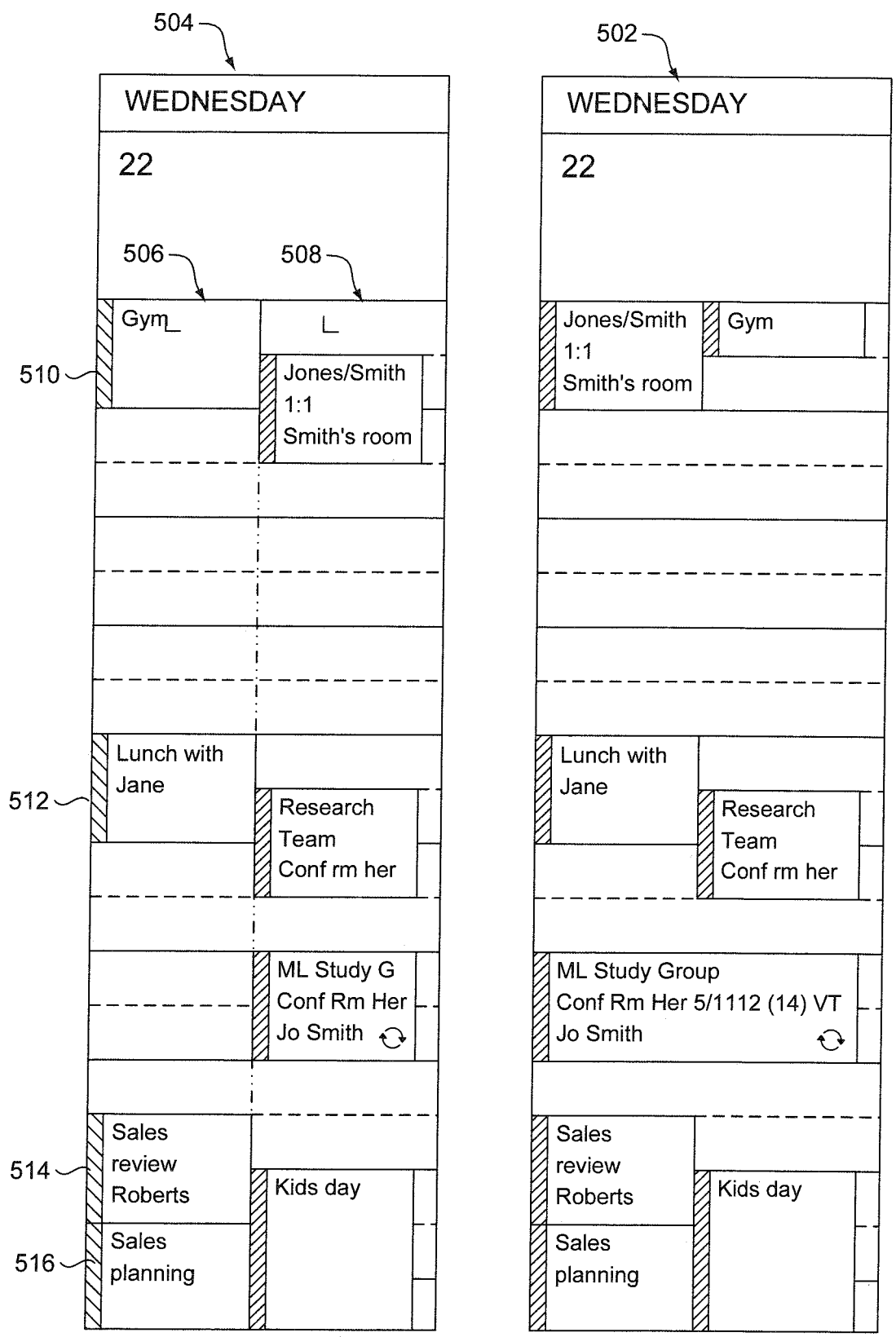
FIG. 5 provides a user interface providing one example of calendar view indicating predicted events, in accordance with embodiments described herein.

In addition to probability dependency graphs and marginal density charts, predicted user event patterns can be presented in any number of other ways. Turning now to FIG. 5, by way of example only, assume conventional graphical user interface 502 illustrates a calendar schedule for a user. As shown, in conventional approaches, there is no indication of a user's likely event path. Now assume graphical user interface 504 illustrates a calendar schedule based on predicted user event patterns. As shown, the calendar items have been reconfigured to indicate a likely event pattern for the user. In this case, the more likely event pattern is presented first, in the left column 506, while the less likely event pattern is presented second, in the right column 508. As illustrated, in this case, the event prediction engine predicts the user is likely to attend the events of the gym 510, lunch 512, sales review 514, and sales planning 516. The more likely user event pattern can be indicated in any number or combination of ways. For example, in addition or in the alternative to placement of calendar items, the more likely event pattern may be represented in a different color (e.g., green), different font (e.g., color or style), highlighted, or other indication (e.g., an alert, symbol, icon, notification). In some embodiments, the format of the less likely alternative(s) may be similarly modified to indicate that these alternative(s) are less likely. For example, they may be greyed out or collapsed/hidden, but with an indication that alternative(s) exist.

In addition or in the alternative to visually presenting user event pattern prediction, notifications or information can also be provided based on predicted events. For example, reminders may be presented in accordance with events predicted to occur in association with a user. The visualizations or notifications described herein can be provided in any number of applications or services, such as a calendar application or service, virtual assistants, etc.

Returning briefly to FIG. 2, storage 225 generally stores information including data, computer instructions (e.g., software program instructions, routines, or services), logic, profiles and/or models used in embodiments of the disclosure described herein. In an embodiment, storage 225 comprises a data store (or computer data memory). Further, although depicted as a single data store component, storage 225 may be embodied as one or more data stores or may be in the cloud.

Turning now to FIGS. 6-9, aspects of example process flows are illustratively depicted for an embodiment of the disclosure. The blocks of these process flows that correspond to actions (or steps) to be performed (as opposed to information to be acted on) may be carried out by one or more computer applications or services, in some embodiments, including a virtual assistant, that operate on one or more user devices (such as user device 104a), servers (such as server 106), may be distributed across multiple user devices and/or servers, or may be implemented in the cloud. In one embodiment, the functions performed by the steps of these process flows are carried out by components of system 200, described in connection to FIG. 2.

Figure 6:
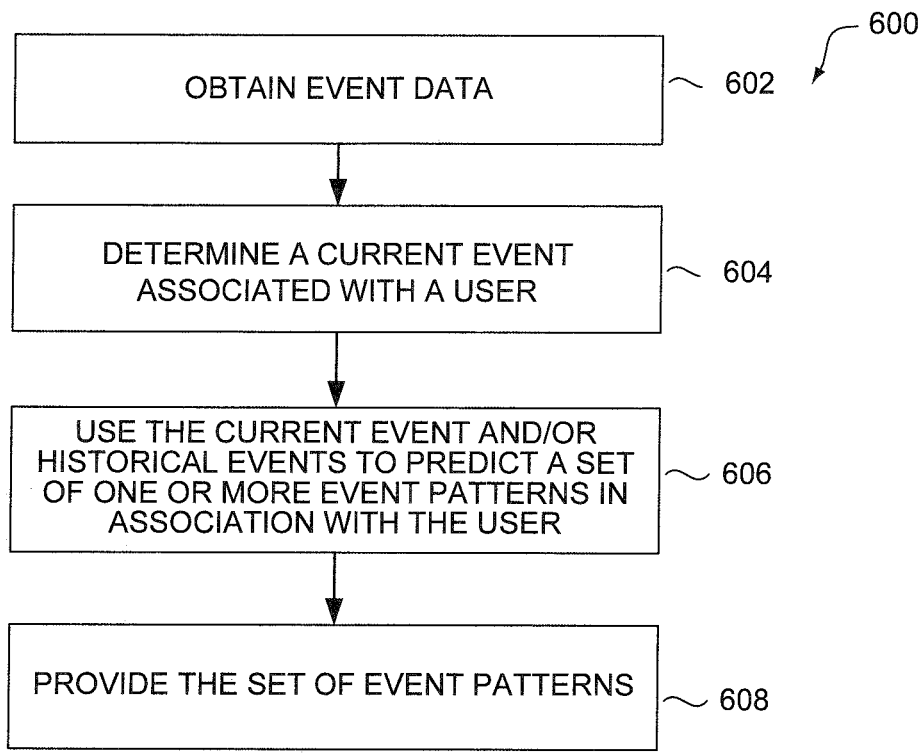
FIG. 6 depicts a flow diagram of a method for predicting user event patterns, in accordance with embodiments described herein.

With reference to FIG. 6, an overview of process flow 600 is illustratively provided. In particular, process flow 600 generally provides an example flow for predicting user event patterns. Initially, at block 602, event data is obtained. Such event data includes user data and contextual data, which can be obtained in any number of ways. At block 604, a current event associated with a user is determined. In this way, a user location might be identified and determined as the current event or used to determine a current event. At block 606, the current event and/or historical events are used to predict a set of one or more event patterns in association with the user. In some embodiments, a Markov model may be utilized to predict the set of event patterns. At block 608, the set of event patterns are provided, for example, for presentation to a user. The set of event patterns can be visually presented in any number of ways to illustrate the predicted event patterns.

Figure 7:
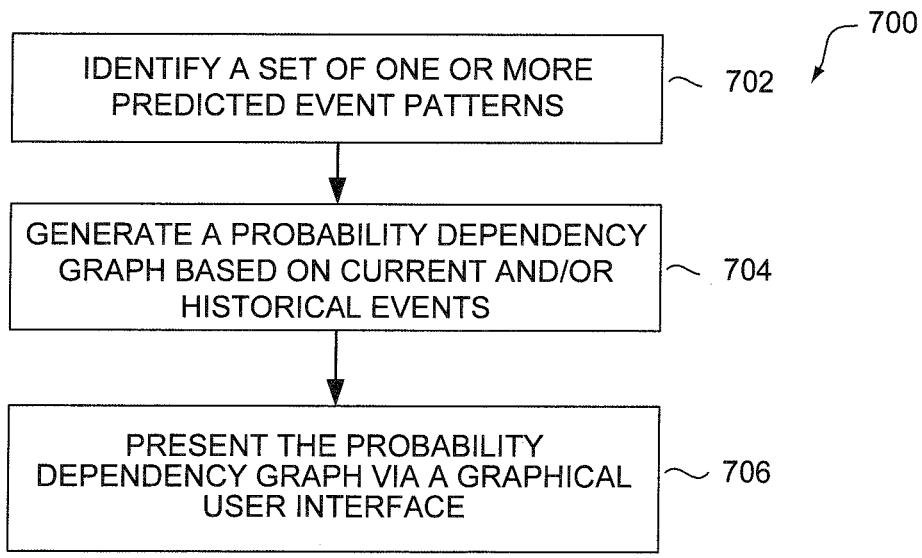
FIG. 7 depicts a flow diagram of a method for predicting and presenting user event patterns via a probability dependency graph, in accordance with embodiments described herein.

Turning now to FIG. 7, process flow 700 generally provides an example flow for presenting predicted user event patterns. At block 702, a set of one or more predicted event patterns are identified. At block 704, a probability dependency graph is generated based on current and/or historical events associated with a user. At block 706, the probability dependency graph is presented via a graphical user interface. In accordance with embodiments described herein, the probability dependency graph can include nodes that represent candidate or possible events, and the links or connections between the nodes represent the various paths and/or corresponding probabilities of the events occurring.

Figure 8:
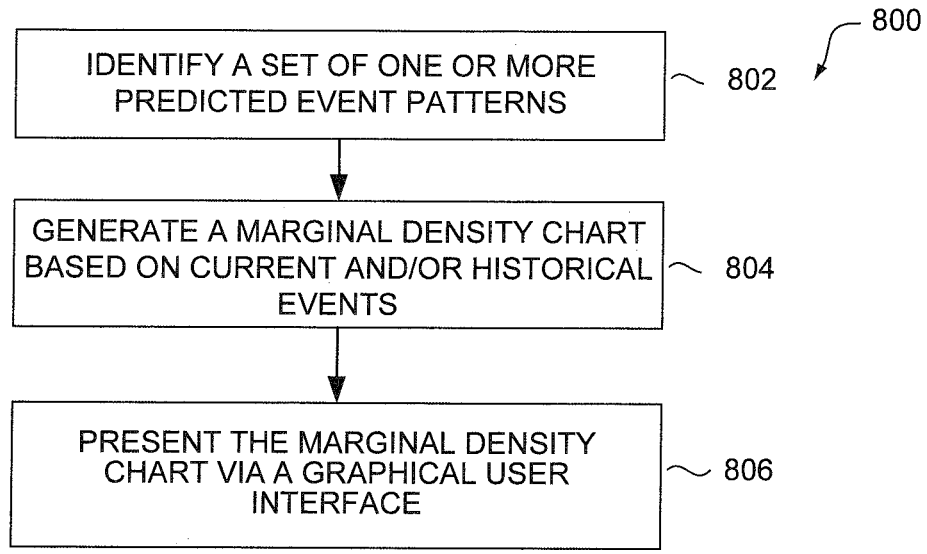
FIG. 8 depicts a flow diagram of a method for predicting and presenting user event patterns via a marginal density chart, in accordance with embodiments described herein.

Turning now to FIG. 8, process flow 800 generally provides an example flow for presenting predicted user event patterns. At block 802, a set of one or more predicted event patterns are identified. At block 804, a marginal density chart is generated based on current and/or historical events associated with a user. At block 806, the marginal density chart is presented via a graphical user interface. In accordance with embodiments described herein, the marginal density chart can includes bars or columns that signify the marginal probability of the user at an event at an aggregated time interval.

Figure 9:
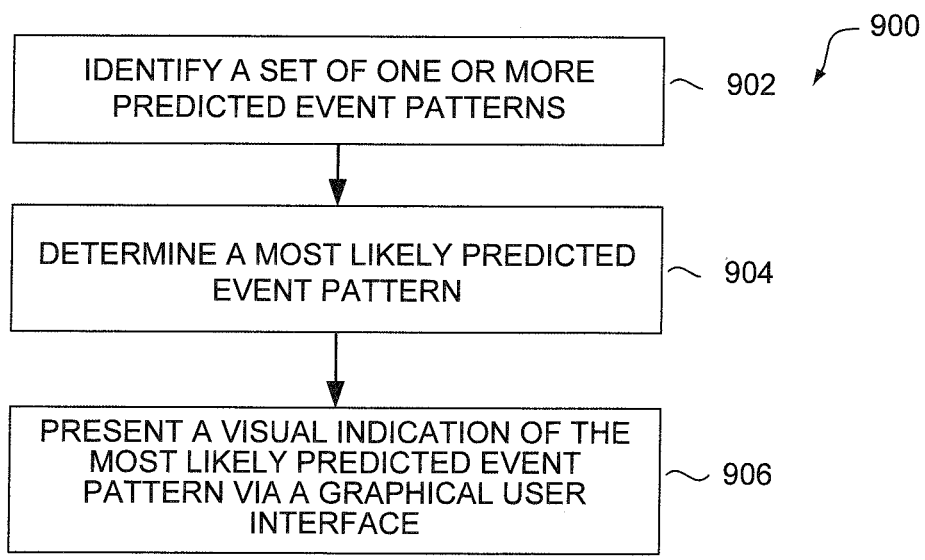
FIG. 9 depicts a flow diagram of a method for predicting and presenting user event patterns via an electronic calendar view, in accordance with embodiments described herein.

Turning now to FIG. 9, process flow 900 generally provides an example flow for presenting predicted user event patterns. At block 902, a set of one or more predicted event patterns are identified. At block 904, a most likely predicted event pattern is determined. At block 906, the most likely predicted event pattern is visually indicated in a calendar view presented via a graphical user interface. The most likely predicted event pattern can be indicated in any number of ways including font, colors, icons, formatting, notifications, etc.

Figure 10:
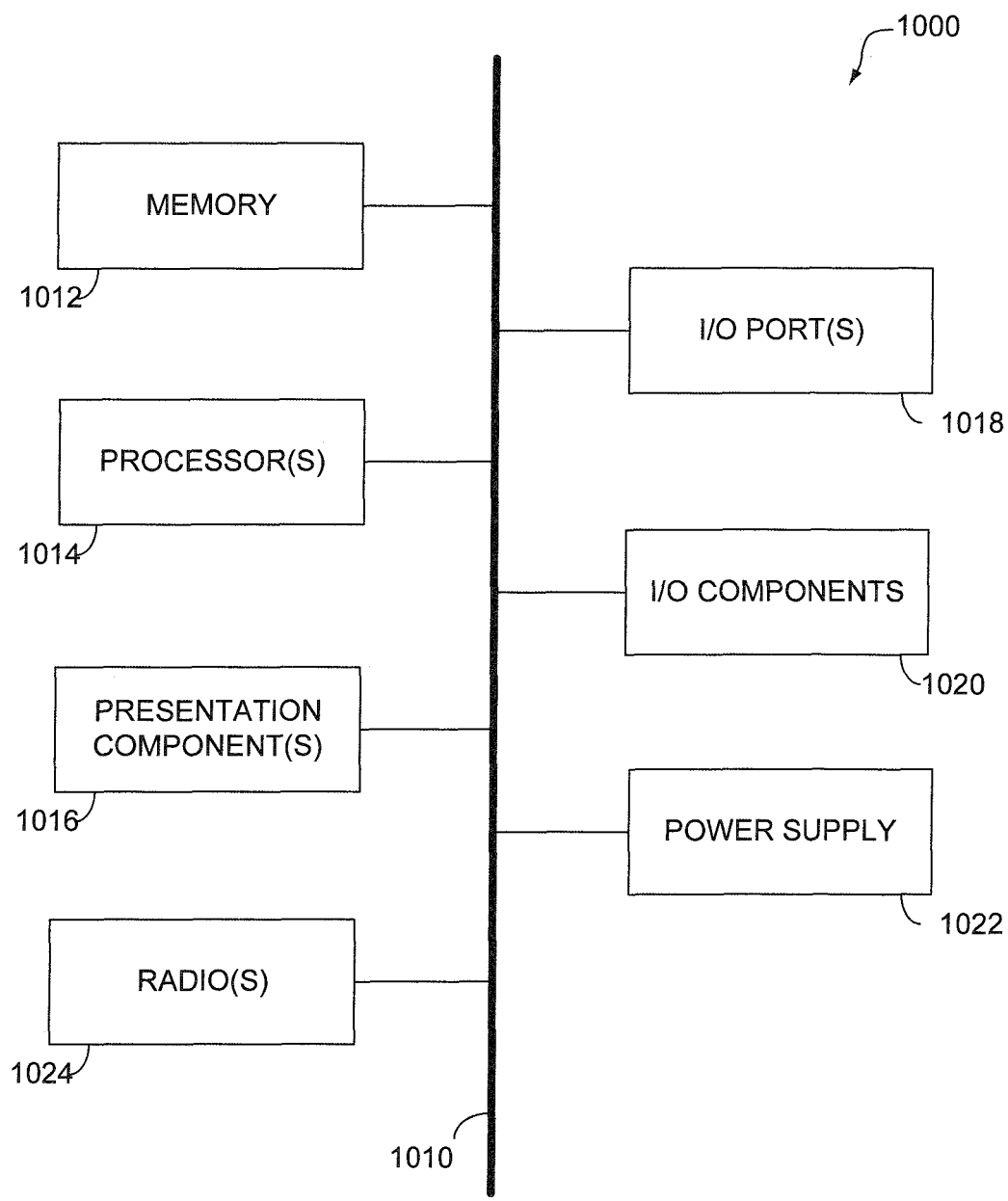
FIG. 10 is a block diagram of an exemplary computing environment suitable for use in implementing an embodiment of the disclosure.

Having described various embodiments of the disclosure, an exemplary computing environment suitable for implementing embodiments of the disclosure is now described. With reference to FIG. 10, an exemplary computing device is provided and referred to generally as computing device 1000. The computing device 1000 is but one example of a suitable computing environment and is not intended to suggest any limitation as to the scope of use or functionality of the disclosure. Neither should the computing device 1000 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 1014 that read data from various entities such as memory 1012 or I/O components 1020. Presentation component(s) 1016 presents data indications to a user or other device. Exemplary presentation components include a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 may include one or more radio(s) 1024 (or similar wireless communication components). The radio 1024 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computerized system comprising:
   one or more sensors configured to provide sensor data comprising at least location information;
   one or more processors; and
   computer storage memory having computer-executable instructions stored thereon which, when executed by the processor, implement a method of providing visual representations of predicted user event patterns, the method comprising:
   determining, using the one or more sensors, a current event including at least a current location of the user;
   based on at least the current event, determining a prediction of user event patterns in association with the user, each of the user event patterns including one or more future events corresponding with the user; and
   causing display of the user event patterns via a graphical user interface, the user event patterns visually represented as a probability dependency graph comprising probabilities of the user proceeding with the user event patterns, and each of the user event patterns further visually represented as a sequence of events in which the user might partake over a timeframe.

2. The computerized system of claim 1, wherein determining the prediction of user event patterns is based on at least the current event and historical events.

3. The computerized system of claim 1, wherein determining the prediction of user event patterns is based on at least the current event and historical events having features similar to the current event.

4. The computerized system of claim 1, wherein determining the prediction of user event patterns comprises utilization of an event prediction model based on a Markov process.

5. The computerized system of claim 1, wherein the user event patterns are visually represented as a tree, wherein each node in the tree represents an event.

6. The computerized system of claim 1, wherein the method further comprises determining probabilities associated with events in the event patterns.

7. The computerized system of claim 6, wherein the determined probabilities are represented in association with the corresponding events in the sequences of events represented as a tree, wherein the edges of the tree indicate a stochastic nature of the sequence of events.

8. The computerized system of claim 1, wherein the determination and display of the predicted user event patterns are updated as the current event is updated.

9. The computerized system of claim 1, wherein the user event patterns visually represented as a sequence of events are provided in accordance with a timeline over which the events are distributed.

10. The computerized system of claim 9, wherein the events are distributed over the timeline in accordance with start and end times for each event.

11. A computing device comprising a computer memory and a computer processor that is configured to provide visual representations of predicted user event patterns, the computing device comprising:
   determining, using one or more sensors, a current event including at least a current location of the user;
   based on at least the current event, determining a prediction of user event patterns in association with the user, each of the user event patterns including one or more future events corresponding with the user; and
   causing display of the user event patterns via a graphical user interface, the user event patterns visually represented in a marginal density chart in which a marginal probability of a user partaking in an event is provided in association with a time interval.

12. The computing device of claim 11, wherein determining the prediction of user event patterns is a pattern-based prediction based on at least the current event and historical events.

13. The computing device of claim 11, wherein determining the prediction of user event patterns comprises utilization of an event prediction model based on a Markov process.

14. The computing device of claim 11, wherein each event in the marginal density chart is uniquely represented.

15. The computing device of claim 14, wherein each event in the marginal density chart is uniquely represented by color or design.

16. A computerized method for providing visual representations of predicted user event patterns, the method comprising:
   determining, using one or more sensors, a current event including at least a current location of the user;
   based on at least the current event, determining a prediction of a user event pattern in association with the user, the user event pattern including one or more future events corresponding with the user; and
   causing display of the user event pattern via a graphical user interface, the user event pattern visually represented in an electronic calendar view among other calendar items by visually emphasizing a set of calendar items in the electronic calendar corresponding with the predicted event pattern, the set of calendar items comprising a first calendar item and a second calendar item, wherein visually emphasizing the first calendar item and the second calendar item is based on corresponding probabilities of the user proceeding the set of calendar items over corresponding other calendar items.

17. The computerized method of claim 16, wherein the predicted user event pattern is determined in accordance with calendar items within the electronic calendar.

18. The computerized method of claim 16, wherein the set of calendar items are visually emphasized in the electronic calendar based on utilization of a color, a font, a style, an icon, an alert, a notification, a placement, or a combination thereof.

19. The computerized method of claim 16, wherein the set of calendar items are visually emphasized in the electronic calendar by placing the set of calendar items in a first alignment and placing the other calendar items in a second alignment.

20. The computerized method of claim 16, wherein determining the prediction of the user event pattern comprises utilization of an event prediction model based on a Markov process.

* * * * *